(12) United States Patent  
Kuzuya

(10) Patent No.: US 6,543,591 B2
(45) Date of Patent: Apr. 8, 2003

(54) AUTOMATED GUIDED VEHICLE SYSTEM

(75) Inventor: Motohiko Kuzuya, Aichi (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 10/032,549

(22) Filed: Jan. 2, 2002

(65) Prior Publication Data

US 2002/0104726 A1 Aug. 8, 2002

(30) Foreign Application Priority Data

Feb. 7, 2001 (JP) ........................................ 2001-031526

(51) Int. Cl.[7] .................................................. B61L 3/00
(52) U.S. Cl. ........................................ 191/10; 191/22 R
(58) Field of Search .......................... 191/10, 2, 22 R, 191/23 A; 312/12, 13, 14

(56) References Cited

U.S. PATENT DOCUMENTS

| 3,038,970 | A | * | 6/1962 | Paluka | .................. | 191/10 |
|---|---|---|---|---|---|---|
| 5,551,350 | A | * | 9/1996 | Yamada et al. | .............. | 104/290 |
| 5,937,977 | A | * | 8/1999 | Takasan et al. | ................ | 191/10 |
| 6,095,054 | A | * | 8/2000 | Kawano et al. | ......... | 104/130.07 |
| 6,109,405 | A | * | 8/2000 | Odachi et al. | ................ | 191/10 |

FOREIGN PATENT DOCUMENTS

JP          9-298801          11/1997

* cited by examiner

*Primary Examiner*—Mark T. Le
(74) *Attorney, Agent, or Firm*—Armstrong, Westerman & Hattori, LLP

(57) ABSTRACT

An automated guided vehicle system can make a conveyor vehicle 13 traveled from a feeder line 5 disposed along a track 12 by supplying the power in a physically non-contact state, wherein the feeder lines are disposed in the both sides of a part of the track, at least one pair of the pick-up units 9, 9 is disposed so as to supply the power from any one of the feeder lines laid in both sides of the track in the conveyor vehicle, and the power is supplied from the pick-up unit whose the power to supply is bigger to the load 19 in the place that the feeder lines are disposed in the both sides of the track. According to the above system, the power can be supplied continuously even in the diverging part, etc.

3 Claims, 4 Drawing Sheets

AUTOMATED GUIDED VEHICLE SYSTEM

FIELD OF THE INVENTION

The present invention relates to an automated guided vehicle system which makes a conveyor vehicle traveled by getting an electric power (hereafter referred to as "power") supplied from a feeder line disposed along a track in a physically non-contact state, more particular to a construction structure of the feeder line and a power receiving system of the conveyer vehicle.

BACKGROUND OF THE INVENTION

So far, the technique that an automated guided vehicle travels on a track in order to carry articles in a factory and a warehouse etc. is known. An internal combustion engine and a motor etc. are used as a driving force of these conveyor vehicles, however a motor is normally used since a driving force utilizing an internal combustion engine emitting exhaust fumes deteriorates the environment when operating in a closed room such as a factory.

There are a battery system and a feeder line system in order to supply the power for operating this motor. In a battery system, a charging station is provided for charging a battery every given process (time), so that it needs to come by and stop at the charging station for charging a battery every time consuming the power stored in it. Consequently, the working efficiency has been deteriorated since it definitely requires time for charging, for example in an in-house carrier system.

The feeder line system, being capable of solving such inconveniences, has a contact type and a non-contact type. In the contact type feeder line system, the power is supplied by constantly contacting a contact body for supplying the power to the feeder line as seen in the train and the monorail etc. However, maintenance is essential in this system as the contact part wears out and it also needs to exchange parts in the contact part periodically. Moreover, the contact type feeder line system cannot be used in an explosion proof area for fear of generating spark in the contact part. Further, there is a problem that it cannot be used in the clean room in such as a semiconductor manufacturing plant since generating the metal powder by wearing out the contact part.

On the other hand, the non-contact type feeder line system has been used in the clean room since the power is constantly supplied without generating dust, as it does not have the contact part. In the structure of this non-contact type feeder line system, the current is applied from a power supply equipment to the feeder line laid along the track and the driving force such as a motor is driven by gaining the power from a magnetic flux through the pick-up coil in the conveyor vehicle side.

The feeder line is laid along the track and the diverging part may be provided in the track for carrying articles effectively. The feeder line is also provided in the diverging part so as to be capable of traveling the automated guided vehicle on this diverging part, wherein the feeder line in this diverging part is diverged from the feeder line annexed to the main traveling track or the different power supply equipment is disposed in each diverging part and the like. When supplying the power by diverging the feeder line, there is a possibility of stopping the automated guided vehicle traveling the track in an intermitted side by intermitting one feeder line in the diverging part and also intermitting power supply.

Moreover, as each diverging part needs the power supply equipment when disposing the different power supply equipment in each diverging part, the manufacturing cost of the automated guided vehicle system itself becomes high and the workload for maintenance is also increased. Further, the phase lag or the difference of the voltage is generated between the feeder line in the main side and the feeder line in the diverging side as the different power supply equipment is used, so that there is a possibility that the receiving power in the automated vehicle side becomes lower or it causes some trouble in the traveling speed and the control by the fluctuation of power.

Consequently, it is an object of the present invention to provide the automated guided vehicle system that the power is supplied continuously even in the diverging part etc.

SUMMARY OF THE INVENTION

The object of the present invention is described as mentioned above, and the means for solving the object will be described below.

According to the first aspect of the present invention, the automated guided vehicle can make the conveyor vehicle traveled by supplying the power from the feeder line disposed along the track in a physically non-contact state, wherein the feeder line is disposed in the both sides in a part of the track, at least one pair of pick-up units is disposed in the conveyor vehicle so as to be capable of supplying the power from any one of the feeder lines laid on both sides of the track, and the power is supplied from the pick-up unit in the bigger side of the supplying power to the load in the part disposed the feeder lines in the both sides.

According to the second aspect of the present invention, the one pair of pick-up units is respectively connected to diodes opposed through the rectifier unit and the load is connected between the diodes.

According to the third aspect of the present invention, the automated guided vehicle can make the conveyor traveled on the circulation track having the bypass on the way, wherein the power is supplied from the feeder line disposed along the track to the conveyor vehicle in a physically non-contact state, the feeder line is composed sequentially throughout the track by disposing one end of the construction rail of the feeder line in the inlet side of the bypass and by disposing the other end in the outlet side of the bypass, and the feeder line is disposed in both sides of the track at a given interval of the inlet and outlet sides of the bypass.

DETAILED DESCRIPTION OF THE PREFERRED EMBODIMENTS

Hereinafter, one preferred embodiment of the present invention will be described with reference to the drawings. First, an automated guided vehicle system with rails utilizing a non-contact type power supplying method will be described.

Figure 1:
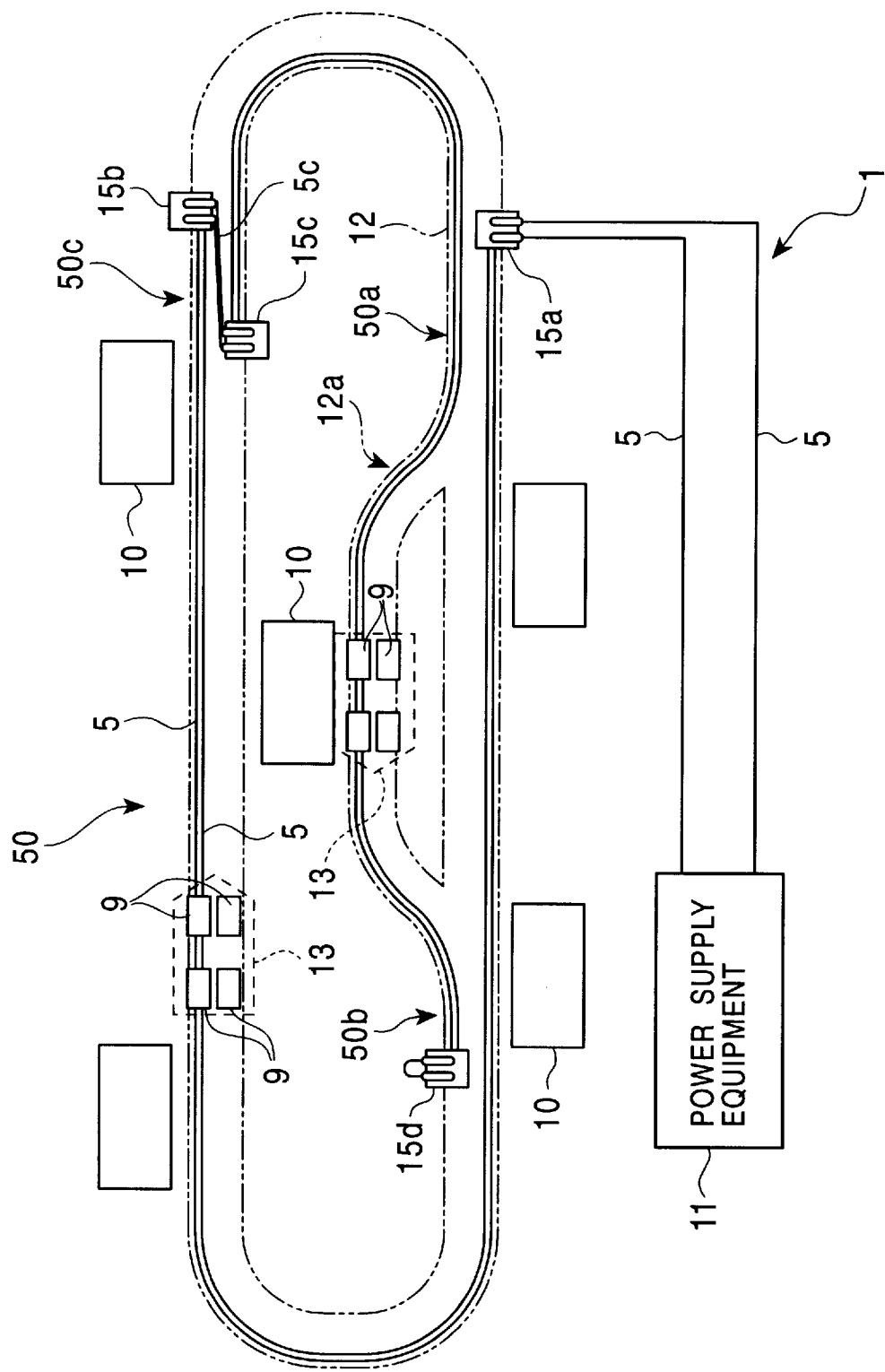
FIG. 1 is a view showing a frame format of an automated guided vehicle system according to a non-contact type feeder line system utilizing a feeder line.

In FIG. 1, a track 12 is laid on the route of an automated guided vehicle (hereafter referred to as "conveyor vehicle") 13, feeder lines 5, 5 covering an electrically conductive wire such as a copper wire with an insulator is disposed along the track 12 and a plurality of stations 10, 10 is disposed in the track 12 side part, so that the conveyor vehicle 13 can be conveyed articles from one station 10 to the other station 10 by traveling between the stations 10, 10.

A power supply equipment 11 is provided in one end of the feeder lines 5, 5 and a power is supplied to the feeder lines 5, 5 at a given frequency (high frequency). The conveyor vehicle 13 is installed so as to be capable of reciprocating along the track when the track 12 is a straight line and so as to circulate along the track when the track is composed as a loop. In an embodiment of the present invention, the conveyor vehicle 13 is arranged to go round in one direction. Moreover, the conveyor vehicle 13 is arranged to travel by a driving motor by the high-frequency current supplied form the power supply equipment 11.

The conveyor vehicle 13 has a pick-up unit 9 for gaining the power from the feeder lines 5, 5, wherein at least one pair of the left and right pick-up units 9, 9 is disposed. In an embodiment of the present invention, two pairs of the pick-up units 9, 9 are respectively disposed in the vicinity of the body of the conveyor vehicle 13. The conveyor vehicle 13 travels on the track 12 utilizing the power gained by the pick-up unit 9.

The track 12, formed in a circulation track, has a bypass 12a on the way. The feeder lines 5, 5 are installed on the track 12 and the bypass 12a, so that a feeding path 50 is totally formed such that one pair of the feeder lines 5, 5 are composed as an outward line and a homeward line. One pair of the feeder lines 5, 5 is disposed in at least one of the left and right sides of the track 12 in order for the conveyor vehicle 13 to be capable of gaining the power wherever on the track 12.

Consequently, the one pair of the feeder lines 5, 5 is installed in the side part of the track 12. One pair of the feeder lines 5, 5 is respectively disposed in both sides in a part of the track 12, so that a total of two pairs of the feeder lines 5, 5 are disposed. In the part that the feeder lines 5, 5 are disposed in both sides of the track 12, one end of the laying rail of the feeder lines 5, 5 is disposed in the inlet side of the bypass 12a and connected to the power supply equipment 11 through a contact button 15a and the feeder lines 5, 5 are disposed so as to be opposed to the horizontal direction in both sides of the main circulation track in the vicinity of the inlet of the bypass (the approach way) 12a, so that an overlapping part 50a of the feeder lines 5, 5 is formed.

The other part of the feeder lines 5, 5 is disposed in the outlet side of the bypass 12a and the end parts of the outward and homeward lines of the feeder lines 5, 5 are connected so as to be short-circuited in a contact button 15d provided in the end part of the feeding path 50. An overlapping part 50b of the feeder lines 5, 5 is formed by disposing the feeder lines 5, 5 so as to be opposed in the horizontal direction in both sides of the main circulation track. Moreover, an overlapping part 50c, making the feeder lines 5, 5 disposed in the outside (or the inside) part of the track 12 traveled to the inside (or the outside) part of the track 12, is provided on the way of the main circulation track except for the circulation track from the overlapping part 50a to the overlapping part 50b. In the overlapping part 50c, contact buttons 15b, 15c are respectively provided in the end parts of the feeder lines 5, 5 connected to the leader side and to the dead end side, and the feeder lines 5, 5 connected to the contact buttons 15b, 15c are disposed so as to be opposed inside and outside in a horizontal direction in a part, and interconnect lines 5c, 5c are arranged to pass over or below the track 12 connecting by the interconnect lines 5c, 5c between the contact button 15b and the contact button 15c.

Therefore, the laying rail of the feeder lines 5, 5 (above feeding path 50) is formed sequentially without crossing or traveling the same path as drawn with a single stroke, so that one power supply equipment 11 connected to the leader end of the contact button 15a of the feeding path 50 can supply the power to the all path of the feeding path 50.

Both an overhead conveyor vehicle and a conveyor vehicle on the floor can be used as the conveyor vehicle 13 if having a track. The preferred embodiment utilizing an overhead vehicle 13A as the conveyor vehicle 13 will be described with reference to FIG. 2, FIG. 3, FIG. 5 and FIG. 6.

Figure 2:
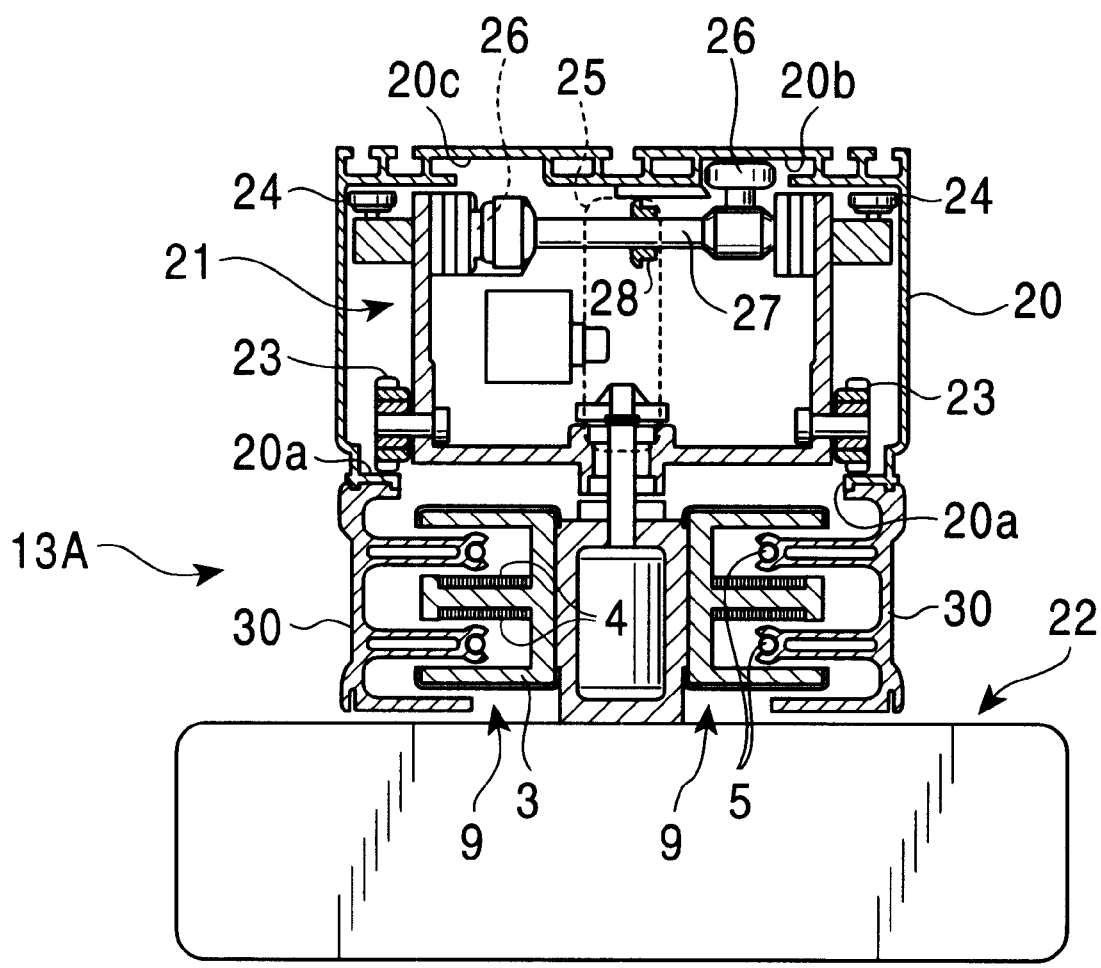
FIG. 2 is a front sectional view of an overhead conveyor vehicle.
Figure 3:
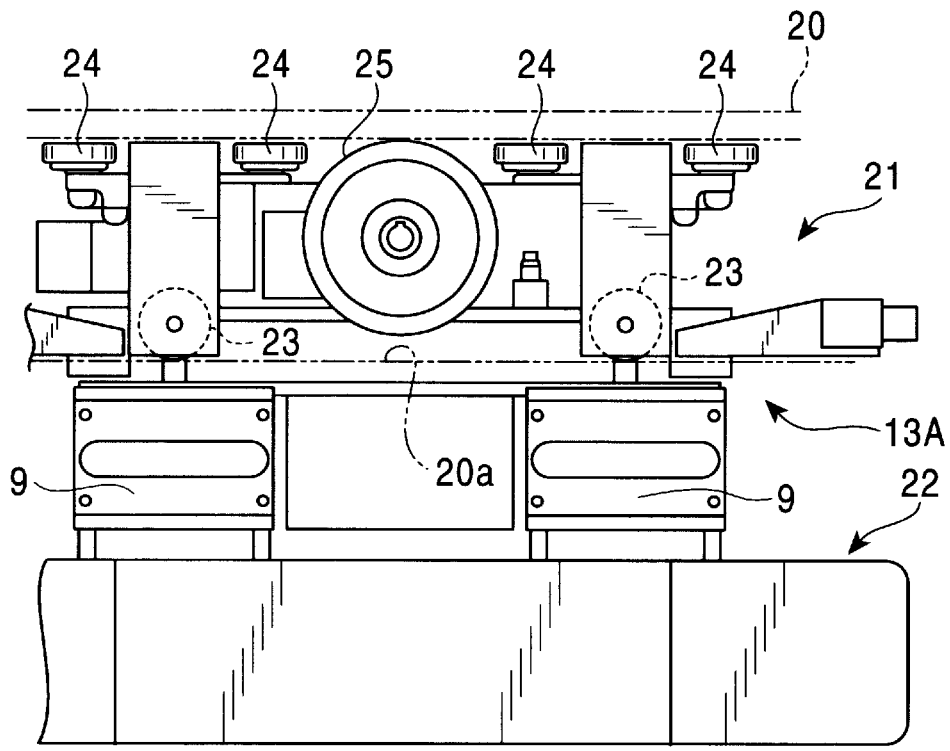
FIG. 3 is a side view of the overhead conveyor vehicle.

In FIG. 2 and FIG. 3, a rail 20 comprising the track 12 is comprised in an inverted U shape as seen from the cross section and fixed to the ceiling. The overhead conveyor vehicle 13A is disposed in the concave part of the rail 20. In the overhead conveyor vehicle 13A, a traveling part 21 is disposed in the upper part, a place part 22 is provided so as to carry articles in the lower part, and the pick-up units 9, 9 are disposed in the above and below central part.

Guide wheels 23, 23 having an axel to the left-right direction are disposed in both sides of the lower part of the traveling part 21, and the prominent part to the inside in the horizontal direction from below the rail 20 is regarded as traveling surfaces 20a, 20a. Guide wheels 24, 24 having an axle to the vertical direction are disposed back and forth in both sides of the upper part of the traveling part 21, and the displacement to the lateral direction (the left-right direction of the traveling direction) can be prevented by utilizing the inside surface of the rail 20 as a guide surface. A traveling driving wheel 25 is disposed in the nearly center of the conveyor vehicle 13 and arranged to be pressured to the traveling surface formed on the upper surface of the inside of the rail 20 by the pressure means such as a spring.

Figure 5:
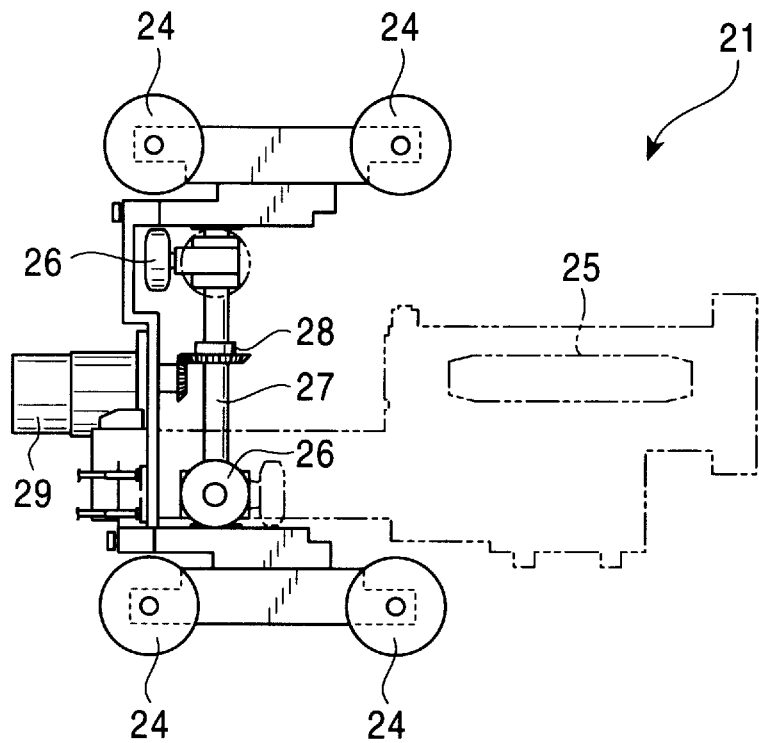
FIG. 5 is a plain view showing an arrangement of an idle wheel.

Moreover, idle wheels 26, 26 are provided for choosing which to travel either the bypass 12a or the circulation track by providing the overlapping part 50a in the upper part of the traveling part 21. In other words, as illustrated in FIG. 2 and FIG. 5, the idle wheels 26, 26 is arranged to be freely rotatable to a support spindle by displacing the support spindle at 90 degrees to both sides of the right and left on a switching spindle 27 crossing over to the left and right directions and by standing out to the vertical direction to the switching spindle 27. A bevel gear 28 is fixed to be connected to a switching motor 29 on the switching spindle 27 and the switching motor 29 rotates normally and reverse, so that the switching spindle 27 rotates and one of the idle wheels 26, 26 is arranged to head for the upper side.

Figure 6:
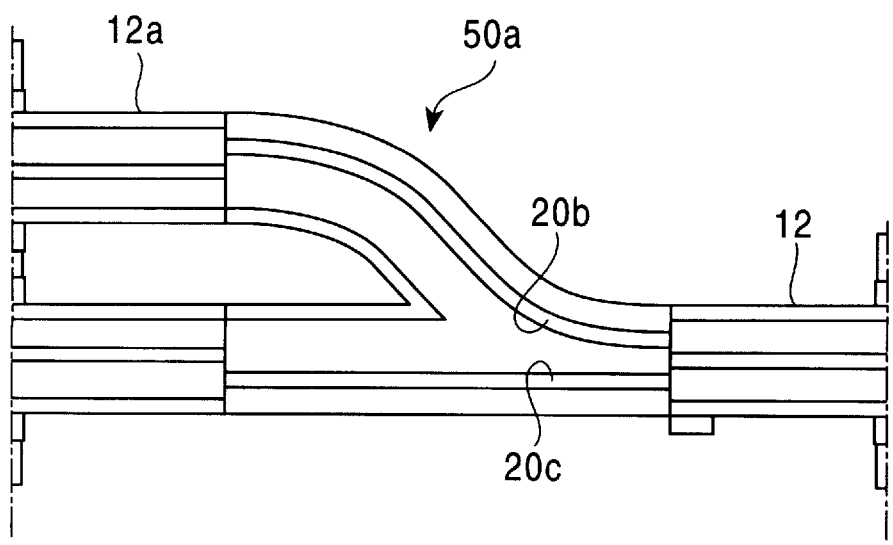
FIG. 6 is a plain view of a track of an overlapping part.

On the other hand, as illustrated in FIG. 2 and FIG. 6, concave guide parts 20b, 20c are provided right and left along the track on the under surface of the upper part of the rail 20 in the track 12 in the overlapping part 50a, the concave guide part 20b being provided along the circulation track and the concave guide part 20c being provided along the bypass 12a.

In such a structure, when the conveyor vehicle 13 proceeding into the overlapping part 50a, either right or left idle wheel 26 is turned upward by driving the switching motor 29, so that the idle wheel 26 protruded upward is entered into the concave guide part 20b or the concave guide part 20c and slides off the concave guide part by escaping in front or backwards. Therefore, the conveyor vehicle 13 can travel along the concave guide part entered the idle wheel 26 by choosing either the circulation track or the bypass 12a.

Consequently, the conveyor vehicle 13 is arranged to choose the circulation track and the bypass 12a and travel by switching one idle wheel 26 loaded the switching mechanism disposed so as to be the non-contact position to one concave guide part between the contact position and the non-contact position by operating the switching mechanism, along with the other idle wheel 26 disposing so as to be the contact position to the other concave guide part.

As mentioned above, a pair of the left and right pick-up units 9, 9 is disposed below the traveling part 21, the one pair of pick-up units 9, 9 is respectively disposed back and forth and a total of four pick-up units 9, 9 are provided in the overhead conveyor vehicle 13A. Moreover, feeder holders 30, 30 are disposed facing to the pick-up unit 9 in the under surface of both sides of the rail 20, that is the both side position of the pick-up unit 9.

A ferrite core 3 whose cross section is nearly E-shaped is fixed in the pick-up unit 9 and a pick-up coil 4 is winded in the protruding part of the center of the core 3. The feeder lines 5, 5 held by the feeder holders 30, 30 are respectively positioned one by one in the space comprising in two concave parts formed between the protruding part in both sides (up and down in the FIG. 2 and FIG. 3) and the central protruding part in between them in the core 3. The pick-up coil 4 receives the magnetic field generated by applying the high-frequency current to these feeder lines 5, 5. The power is gained from the induced current generated in the pick-up coil 4 by utilizing the electromagnetic induction. Therefore, the motor for traveling is driven or the power is supplied to the control equipment by supplying the power from the feeder lines 5, 5 to the pick-up unit 9 in a physically non-contact state.

Figure 4:
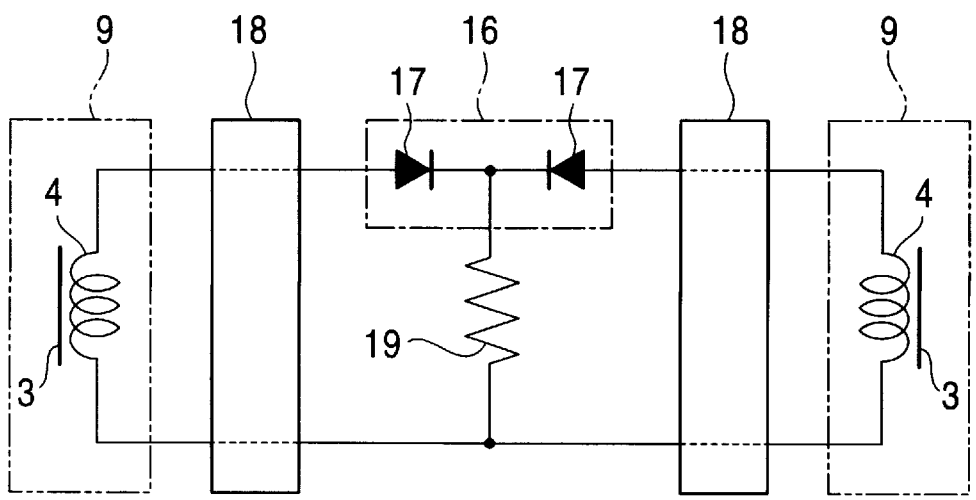
FIG. 4 is a circuit diagram showing a mechanism in supplying power from pick-up units to a load.

When the conveyor vehicle 13 passes over the overlapping parts 50a, 50b, 50c on the track 12, the conveyor vehicle 13 is capable of receiving the power from either feeder lines 5, 5 in the left and right of both sides. A mechanism for supplying the power to the conveyor vehicle 13 when being capable of supplying the power in both sides will be described with reference to FIG. 4. FIG. 4 is a circuit diagram showing the mechanism for supplying the power from the pick-up units 9, 9 to a load 19.

The electric circuit comprises a pair of pick-up units 9, 9, a pair of rectification units 18, 18, a backflow prevention circuit 16 and the load 19. In this electric circuit, the electric current gained in the pick-up unit 9 is sent to the load 19 by rectifying in the rectification unit 18 and converting the constant current to the constant voltage by the impedance converter circuit (not shown in the drawings) through the backflow prevention circuit 16. The detail is described below, however the backflow prevention circuit 16 decides which the pick-up unit 9 is used for supplying the power.

As illustrated in FIG. 4, the power is supplied from the left or right pick-up unit 9 whose electric power is bigger than the other to the load 19 in the conveyor vehicle 13. The motor or the control equipment etc. in the conveyor vehicle 13 is used as the load 19.

Additionally, only one pair of the pick-up units 9, 9 will be described below as the mechanism is same though a pair of the pick-up units 9, 9 are disposed back and forth in the conveyor vehicle 13.

The backflow prevention circuit 16 comprises a pair of diodes 17, 17 disposed in opposing each other. Moreover, one pair of the respective pick-up units 9, 9 is connected in parallel to the load 19 through the rectification unit 18 and the backflow prevention circuit 16. In other words, the load 19 is connected in between the diodes 17, 17, and the electric power can be supplied from any one of a pair of the respective pick-up units 9, 9 to the load 19. The rectification unit 18, comprising the rectifier (the diode or the thyristor etc.), the capacitor and the inductor etc., converts the alternative current received in the pick-up unit 9 to the direct current in the rectification unit 18 and the direct current is supplied to the load 19 side.

When supplying the power respectively to the input side of the both diodes 17, 17 comprising the backflow prevention circuit 16, the power tends to flow from the side whose power is big to the load 19 or to the diode 17 side whose power is low, however the power is supplied from the pick-up unit 9 whose power is big to the load 19 as a result since the power intended to flow to the lower side is blocked by the diode 17.

Meanwhile, the reason for generating the power gap in the pick-up units 9, 9 is that the power capable of gaining is changed when changing the positions of the feeder lines 5, 5 to the pick-up units 9, 9. For example, when the conveyor vehicle 13 is diverged from the overlapping part 50a to the circulation track or the bypass 12a, the feeder line 5 is kept in a nearly given position in one pick-up unit 9, but the feeder line 5 is departed from a given position and the power capable of gaining becomes low in the other pick-up unit 9.

According to the structure mentioned above, when the conveyor vehicle 13 is passed over the overlapping parts 50a, 50b, 50c on the track 12, the power is supplied from the left and right feeder lines 5, 5 through the pick-up units 9, 9. A power is nearly constant and the other power gradually becomes lower in the part that the track is diverged, the power in the bigger side (a given side) is supplied to the load 19 through the rectification unit 18 and the diode 17. Therefore, the receiving power in the conveyor vehicle 13 can be kept nearly constant. Moreover, a power is nearly constant and the other power gradually becomes bigger in the part that the track is converged, so that the receiving power can be kept nearly constant. Further, in the vicinity of the overlapping part 50c, the power is switched from one to the other and the power is kept nearly constant, as the vicinity of the switching part is straight-line.

According to the first aspect of the present invention, the automated guided vehicle system can make the conveyor vehicle traveled by supplying the power from the feeder line disposed along the track in a physically non-contact state, wherein the feeder lines are disposed in the both sides in a part of above track, at least one pair of the pick-up unit is disposed so as to be capable of receiving the power from any one of the feeder lines laid in both sides of the track in the conveyor vehicle, and the power is supplied from the pick-up unit in the side that the supplying power is bigger in the part that the feeding line is disposed in the both sides, so that the interval that the feeder line is continued intermittently can be prevented to generate. Further, as the feeder lines are provided in both sides in a part of the track, the feeder line becomes the midway part in the other side even if the feeder line becomes the dead end in one side on the track, and the power can be surely supplied from the feeder line to the pick-up unit in any one of the lift and right sides. The conveyor vehicle can be prevented from stopping for the power shortage as it can be gained power from the pick-up unit whose power is bigger.

According to the second aspect of the present invention, above a pair of the pick-up unit is respectively connected to the diode opposed through the respective rectification units and the load is connected between the diodes, so that the power can be supplied from the side whose power is bigger in a simple structure and the number of the members and the cost can be reduced.

According to the third aspect of the present invention, the automated guided vehicle system can make the conveyor vehicle traveled on the circulation track having the bypass on the way, wherein the power is supplied from the feeder line disposed along the track to the conveyor vehicle in a physically non-contact state, the feeder line is composed sequentially throughout the track by disposing one end of the laying track of the feeder line in the inlet side of the bypass and disposing the other end in the outlet side of the bypass, and the feeder line is disposed in the both sides of the track at an given interval of the inlet side and the outlet side of the bypass, so that a pair of the feeder lines having both-way feeder lines can be disposed along the track without crossing or can be disposed as drawn with a single stroke without diverging, and the power can be supplied by one power supply equipment. Therefore, the disposing number of the power supply equipment can be reduced and the structure becomes simple, so that the cost can be reduced and the maintenance can be easier. Moreover, when supplying the power from the different power supply equipment, the phase lag and the lowering of the power can be prevented as the power is supplied by the same power supply equipment though there is a possibility that the receiving power becomes lower in the pick-up unit by the phase lag between the feeder lines.

What is claimed is:

1. An automated guided vehicle system, comprising:
   a conveyor vehicle having a plurality of power pickup units;
   a track along which the conveyor vehicle is held and travels;
   a power supply; and
   a feeder line of a plurality of feeder lines connected to the power supply disposed on both sides of a part of the track and disposed on only one of the remainder of the track, wherein at least one pick-up unit of the plurality of power pickup units is disposed so as to supply the power to the conveyor vehicle in a physically non-contact state from any one of the feeder lines laid on both sides of the track, and only in said part of the track where said feeder line of the plurality of feeder lines is on both sides of the track, the power is supplied from the pick-up unit in the side, whose power is larger than a load in the part of that feeder line disposed in the both sides of the track.

2. An automated guided vehicle system according to claim 1, wherein the plurality of power pickup units is a pair of the pick-up units respectively connected to opposed diodes through a rectification unit, and the load is connected between the diodes.

3. An automated guided vehicle system, comprising:
   a conveyor vehicle having a plurality of power pickup units;
   a circulation track having a bypass along which the conveyor vehicle is held and travels;
   a power supply; and
   a feeder line connected to the power supply and disposed continuously throughout the track in a physically non-contact state with the vehicle, the feeder line being positioned on one side of the track before the inlet side of the bypass and on the other side of the track after the outlet side of the bypass, the feeder line being disposed in both sides of the track at the inlet and outlet sides of the bypass, wherein power to the conveyor vehicle is supplied from the pick-up unit in the side of the track at the bypass whose power is larger.

* * * * *